Oct. 19, 1926.
L. M. WOOD
VALVE SPRING LIFTER
Filed Feb. 26, 1923    3 Sheets-Sheet 1
1,603,731
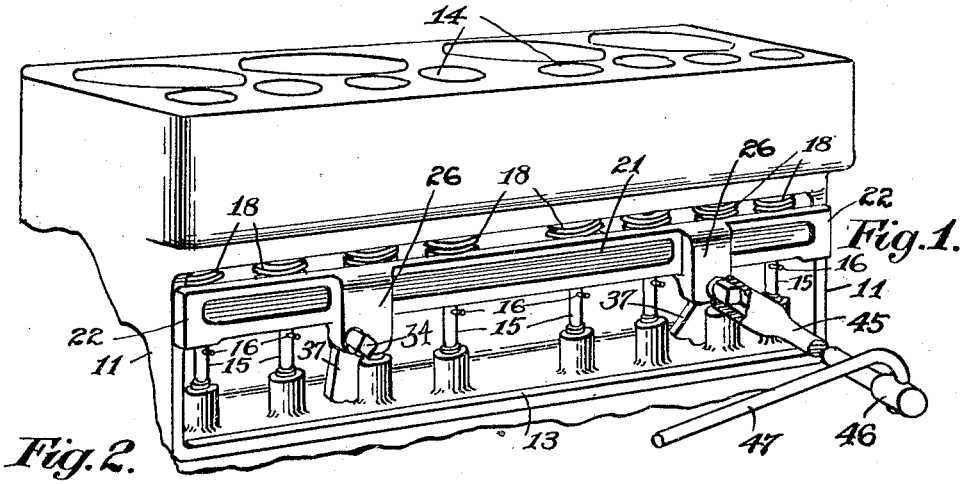
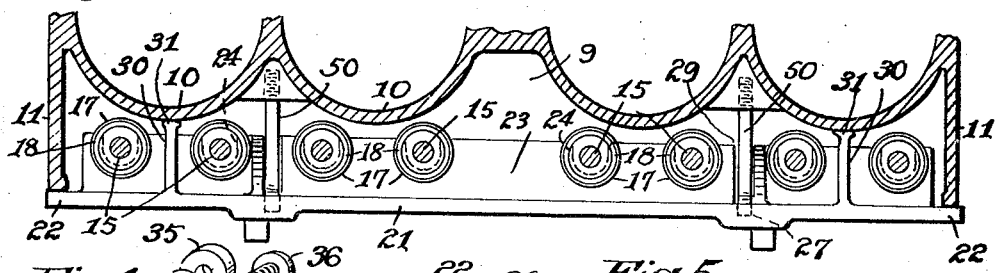
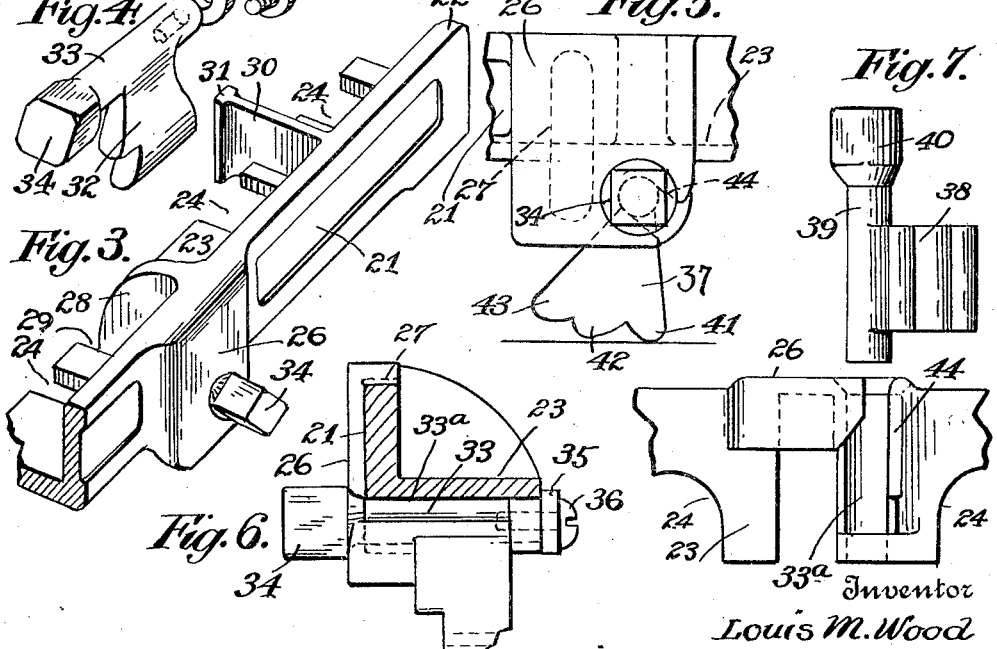
Inventor
Louis M. Wood
By his Attorneys
Weed & Gray Oct. 19, 1926.　　　　　　　　　　　　　　　　1,603,731
L. M. WOOD
VALVE SPRING LIFTER
Filed Feb. 26, 1923　　　3 Sheets-Sheet 2
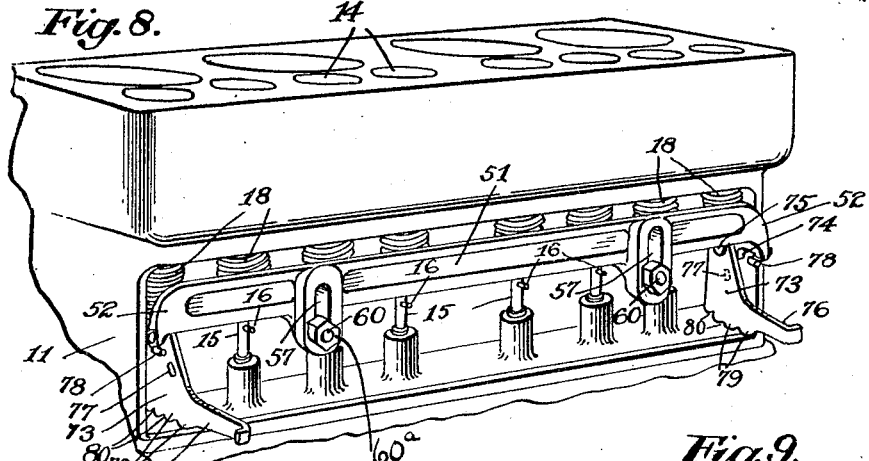
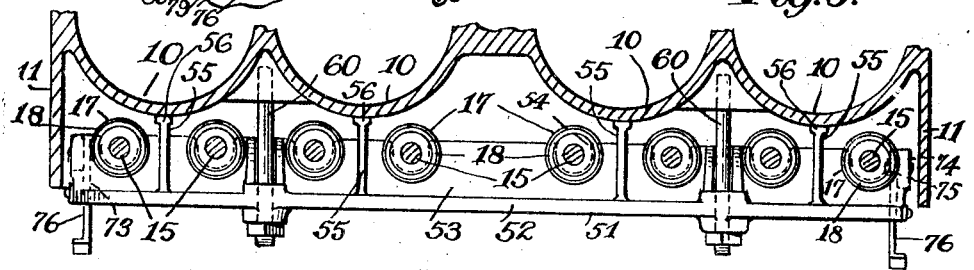
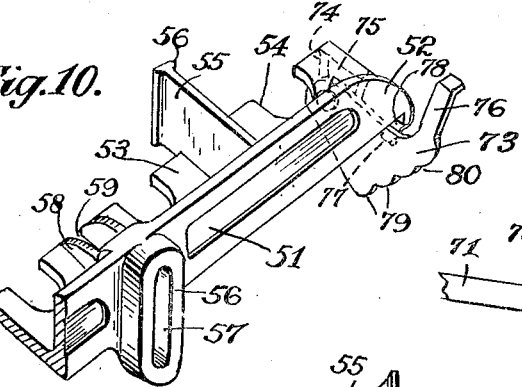
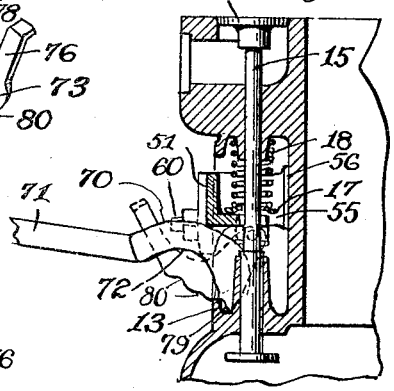
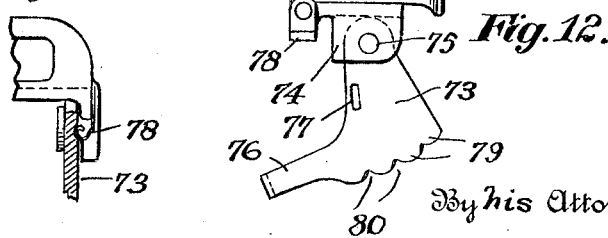
Inventor
Louis M. Wood
By his Attorneys
Weed & Gray

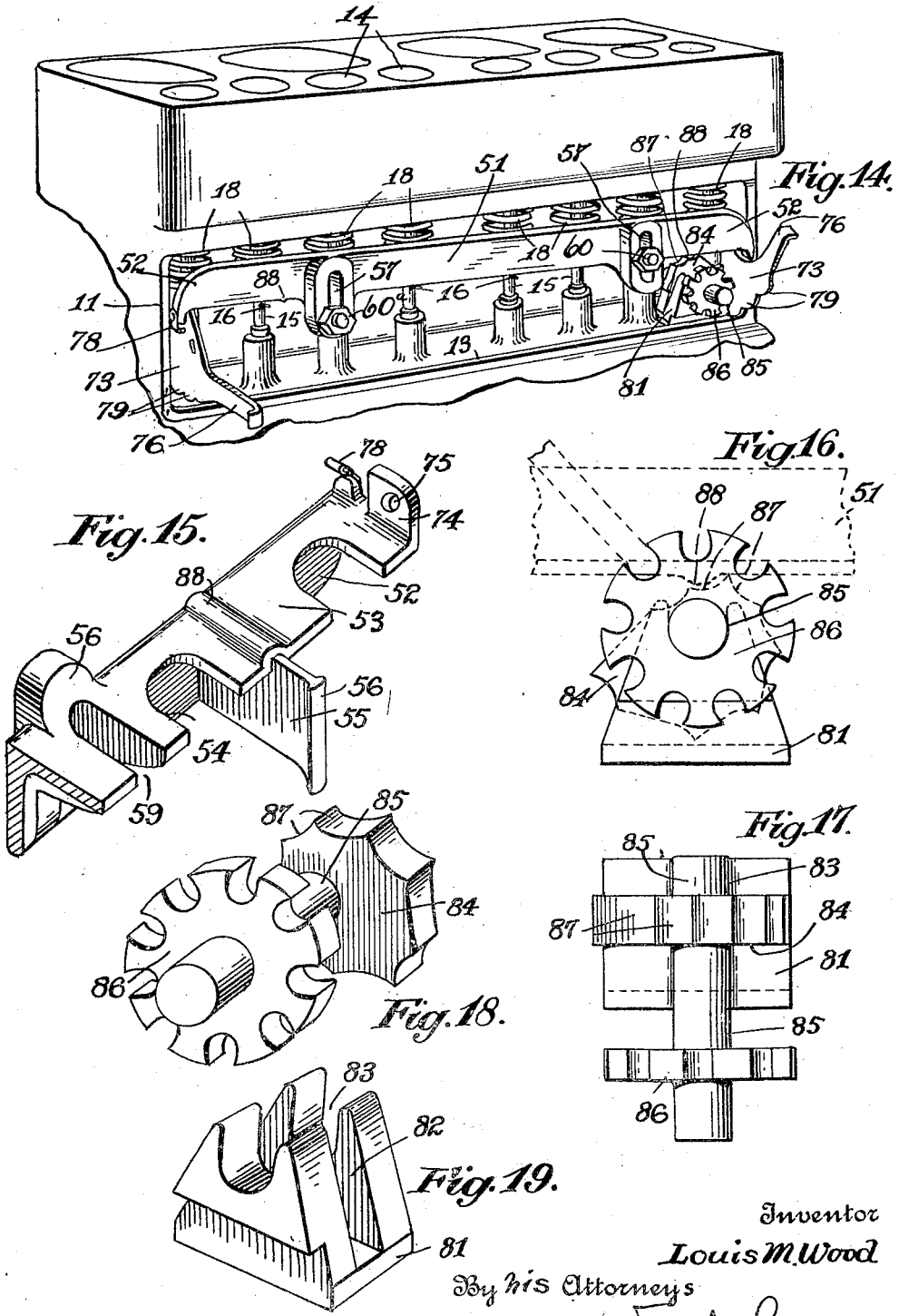

Patented Oct. 19, 1926.

1,603,731

UNITED STATES PATENT OFFICE.

LOUIS M. WOOD, OF NEW YORK, N. Y., ASSIGNOR TO SPEED-O MULTIPLE VALVE LIFTER CORPORATION, OF NEW YORK, N. Y., A CORPORATION OF NEW YORK.

VALVE-SPRING LIFTER.

Application filed February 26, 1923. Serial No. 621,146.

This invention relates to valve lifters for internal combustion engines, an object of the invention being to provide improved mechanism for lifting under compression a plurality of valve springs so that irrespective of the pressure exerted by the springs the latter can be lifted and maintained in lifted or elevated position with a minimum of effort and with the least possible expenditure of strength.

A further object of this invention is to provide mechanism for elevating under compression valve springs of the engine, the mechanism having improved camming means for compressing the valve springs, thereby reducing to a minimum the amount of power or strength necessary to operate the mechanism.

A further object of this invention is to provide valve spring lifting mechanism operative in a step by step manner for elevating under compression the valve springs, in the present instance this being accomplished by camming means having a stepped operating face, so that the pressure exerted by the springs will be easily overcome due to the improved construction.

A further object of this invention is to provide an improved valve spring lifting mechanism which will be relatively cheap to manufacture, relatively simple in construction, adapted to be operated with great facility and with the expenditure of a minimum of power, and efficient and effective in use.

A further object of this invention is to provide lifting mechanism for valve springs having improved means for maintaining the mechanism in elevated position, and preferably adapted to lock or hold the mechanism in various adjusted positions.

Other objects of this invention will appear in the following description thereof, reference being had to the accompanying drawings forming a part of this specification, wherein like reference characters indicate corresponding parts in the several views and wherein Fig. 1 is a perspective view illustrating one form of my invention in operative position; Fig. 2 is a sectional plan view thereof taken through the cylinder block; Fig. 3 is a fragmentary perspective view of another form of valve lifter; Fig. 4 is a perspective view of a lifting cam therefor; Fig. 5 is an enlarged front view illustrating the construction of the lifting cam shown in Fig. 1; Fig. 6 is a cross section illustrating the lifting cam of Fig. 3; Fig. 7 is a bottom plan detail view illustrating a modified form of lifting cam in position to be connected to the lifting bar; Fig. 8 is a perspective view illustrating another form of lifting mechanism in operative position; Fig. 9 is a cross section taken through the cylinder block; Fig. 10 is a fragmentary perspective view of the lifting mechanism shown in Figs. 8 and 9; Fig. 11 is a sectional elevation thereof; Fig. 12 is a detail end view illustrating a locking support; Fig. 13 is a front sectional view thereof; Fig. 14 is a perspective view of a modified form of lifting mechanism; Fig. 15 is a fragmentary perspective view illustrating the under side thereof; Fig. 16 is a detail front view showing another form of lifting cam mechanism; Fig. 17 is a top plan view thereof; and Figs. 18 and 19 are detail perspective views of parts thereof.

Before explaining in detail the present improvement and mode of operation thereof, I desire to have it understood that the invention is not limited to the details of construction and arrangement of parts which are illustrated in the accompanying drawings, since the invention is capable of other embodiments, and that the phraseology which I employ is for the purpose of description and not of limitation.

The present improved mechanism for elevating or lifting under compression the several valve springs of the engine is of course, adapted to be used in connection with various type of engines; and although one form of engine is herein illustrated by way of example it is obvious that the mechanism may be adapted to other engines having different numbers of cylinders. It is also understood that the form and design of the mechanism may be altered in order to adapt the mechanism to different engines having different forms and arrangement of parts.

Referring particularly to Figs. 1 to 7 inclusive, the motor block of the engine is provided with the usual valve spring chamber 9 which is adapted to be closed at the front thereof with a suitable cover plate (not shown), the cover plate in the engine illustrated being held in position by studs or bolts 60 and nuts 60ª, which are adapted to be screwed on to the ends of the bolts. The valve spring chamber 9 is located within a housing or casing comprising the cylinder walls 10 and forwardly extending end walls 11, the latter adapted as shown in Figs. 1 and 2 to form guide means for the ends of the valve spring lifter or bar as will hereinafter be described. The front of the valve spring housing is also provided with the usual upwardly projecting lip or flange 13 extending along the lower edge thereof. The valves 14 are provided with valve stems 15 which extend into the chamber 9, and adjacent to the lower ends of the valve stems are located retaining pins 16 against which the valve spring retaining seats 17 impinge when in normal position, the seats 17 being constructed to receive the ends of the valve springs 18 which are held between the upper wall of the chamber 9 and the seats 17.

The present improved mechanism comprises a lifting bar 21 preferably terminating at opposite ends thereof in projecting guide portions 22, which, when the bar is applied to the front of the housing as shown in Figs. 1 and 2, overlie the ends 11 of the housing and cooperate therewith to guide the lifting bar in a vertical plane against displacement inwardly relatively to the valve springs. The lifting member 21 is preferably an angle bar having extending therefrom a horizontal member 23, preferably as in the present instance cast integrally with the upright member 21. At suitable intervals the member 23 is provided with recesses 24 adapted to freely embrace the valve stems 15 and permit the seating of the retainers 17 on the upper edges thereof. The bar 21 intermediate its ends is provided in the present instance with a pair of enlarged portions 26, each being cut away at the rear side thereof to form a closed vertical guide slot 27. Extending rearwardly from the enlarged portion 26 is a reinforcing portion 28 connected to the horizontal member 23 of the lifting bar, and through the latter extends a guide slot 29 communicating with the vertical slot 27. It will be seen that the housing bolts or studs 50 extend into the slots 27, as shown in Fig. 2, the slots 29 and 27 permitting passage of the bolts 60 when the bar 21 is elevated.

Extending rearwardly from the vertical member 21 and preferably cast integral with the horizontal member 23 are a pair of spaced guides 30 which overlie the rear edge of the member 23 and are provided with enlarged guide portions 31 which engage the vertical curved walls 10 of the cylinders. It will be noted that these guides 30 engage the cylinder walls and are located preferably adjacent to the ends of the lifting mechanism so as to prevent any relative transverse movement of the ends of the bar when being lifted. The vertical guide slots 27 at the same time cooperate with the housing bolts 50 so as to guide the lifting mechanism against endwise movement. As shown particularly in Figs. 4 and 6 the lifting member may be elevated by means of a swinging cam 32 which has a transverse pivot or spindle 33 extending through a suitable slot 33ª in the enlarged portion 26 and the horizontal member 23 of the lifting member. The pivot or spindle 33 is provided at one end with a squared end 34 and at the opposite end is detachably held in position by means of a washer 35 and a set screw 36. As shown in Figs. 1 and 5 the mechanism may be lifted by means of a cam having a stepped operating face. This cam may be constructed either in the form shown at 37 in Figs. 1 and 5, or if desired may be in the enlarged form shown at 38 in Fig. 7. In each case the cam 37 or 38 is carried by a suitable pivot pin or spindle 39 having a wrench receiving portion 40 at one end.

As shown in Fig. 7 the pin or spindle 39 may be slipped into the transverse slot 33ª and is adapted to be detachably held in position in the manner shown in Fig. 6. The cams 37 and 38 are each provided with steps or cam surfaces 41, 42, and 43, each surface being curved and located at progressively greater distances from the axis of the cam, so that upon applying a wrench to the squared portion 40 and swinging the cam 37 on its pivot 39 the lifting member may be elevated in a step by step manner and may be maintained at several different heights according to the position of the cam surfaces 41, 42, and 43 with relation to the bottom of the valve spring chamber. The slots 33ª terminate at one side in a stop portion 44 against which the upper part of the cam 32, 37 or 38 is adapted to impinge upon swinging the same to elevate the lifting bar, the stop preventing the cam from being swung too far. For the purpose of operating these cams a wrench 45 is provided which has a rearwardly extending shank 46 to which is pivoted for horizontal swinging movement, a handle 47. The handle 47 may be swung to the position shown in Fig. 1 for the purpose of rotating the wrench, and also may be swung in juxtaposition to the shank 46 when not in use.

Referring to Figs. 8 to 13 inclusive it will be seen that the lifting member 51 is also as hereinbefore described formed from an angle bar comprising a vertical member 52 and a horizontally extending member 53 adapted to operate against a plurality of valve springs. As in the previous instance, the horizontal member 53 is provided with valve-receiving recesses 54 and rearwardly extending guides 55 having enlarged portions 56 for engagement with the curved walls of the cylinders are also provided. These parts are substantially as hereinbefore described and therefore further detailed description is not deemed necessary. Intermediate the ends of the bar 52 the latter is preferably enlarged at 56 and a vertical guide slot 57 is provided therein. The member 53 is also reinforced at 58 through which extends a slot 59 communicating with the slot 57. The slots 57 and 59 receive the housing bolts or studs 60 of the valve spring chamber and when the lifting member 51 is located in position the same is guided against endwise movement by means of the studs 60 traveling in the slots 57 and 59.

It will be noted that the angle bar 51 has a rounded edge against which the curved camming edge 70 of a lever 71 engages, the lever having a pair of biufurcated prongs provided at the ends thereof with notches which fit over the lip 13 of the valve spring chamber. Thus, by swinging the lever 71 upwardly as shown in Fig. 11, the curved camming edges 70 will engage the curved edge 60 and elevate the member 51 and also lift the valve springs under compression.

The lifting member 51 is adapted to be maintained in elevated position by means of locking supports 73 at opposite ends thereof. The horizontal member 53 is provided at opposite ends thereof with depending portions 74 to the inner faces of which are pivoted at 75 the locking supports 73. Each support is provided with a handle portion 76 and with recesses 77 into which are adapted to extend springs 78 when the members 73 are swung upwardly to the positions shown in Figs. 10 and 13. The bottom edge of each locking support 73 is provided with a series of steps 79 forming notches 80, and located at progressively increasing distances from the pivotal axis 75 of the support so that the lifting member 51 will be maintained at various adjusted heights depending upon which notch 80 is disposed against the lip 13 of the valve spring chamber. Thus, the locking supports 73 are normally held in the position shown in Fig. 10 by means of springs 78, but upon elevating the mechanism by means of levers 71 the same may be held in various adjusted heights by releasing the locking supports 73 from their springs and permitting one of the notches 80 to be seated upon the lip 13 of the valve spring chamber, thus securely holding the lifting mechanism in elevated position. Thus, by means of the self-adjusting locking supports it is possible to support the lifting bar in various positions according to the extent to which the springs of the particular engine may be compressed, thus permitting the mechanism to be used with various types of engines.

In Figs. 14 to 19 inclusive the elevating mechanism may be substantially the same as hereinbefore described in connection with Figs. 8 to 12 inclusive. In this instance, the lifting member which elevates the valve spring under compression is operated by means of a swinging cam having a stepped operating face which may be positioned entirely beneath the lifting bar at various points along the under side thereof. The camming mechanism preferably comprises a suitable cam block or support 81 having transverse slots 82, and 83; a cam 84 is mounted upon a pivot pin or spindle 85 which is journaled in bearings formed by the transverse slot 83 and at the opposite end of the pivot or spindle 85 is secured a suitable slotted disk 86 into the slots of which may be fitted a suitable wrench for rotating and swinging the cam 84. This cam is provided with a stepped operating face comprising a series of curved steps 87 which are located progressively increasing distances from the axis 85 of the cam. The under side of the horizontal bar 53 of the lifting member 51 may be provided with curved ribs 88 extending transversely thereof. When it is desired to elevate the lifting bar 51, the block 81 is placed beneath the horizontal member 53 with the lowest cam surfaces 87 engaging the curved rib or camming surfaces 88. By means of a suitable wrench which is connected to the wrench-receiving disk 86, the latter may be rotated so as to rotate the pivot or spindle 85 and swing the cam 84 so that the several stepped surfaces 87 will progressively engage the curved rib 88 and elevate the lifting member in a step by step manner. From this construction it will be seen that the lifting mechanism may be elevated to several self-adjusting positions and that by operating the same in a step by step manner the power necessary to overcome the pressure of the springs will be greatly minimized, and yet at the same time the mechanism may be lifted to compress all the springs very quickly. When the bar 51 has been elevated at one end the locking support 73 may be released from its spring 78 and swing downwardly so as to maintain the lifting bar in elevated position. Whereupon the block 81 and its camming parts may be removed from beneath said end of the lifting bar and positioned at the opposite end thereof. Upon elevating said end of the lifting member 51 the locking support 73 at said end of the member may be positioned so as to maintain the same in elevated position whereupon the camming mechanism may be removed from the valve spring chamber.

It is to be understood that by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. In a valve spring lifter, the combination of a lifting member having means for operating simultaneously against a plurality of valve springs, camming means having a wrench receiving member for the reception of a wrench for operating said camming means and located directly under said lifting member and between the valve springs and the bottom of the valve spring chamber and constructed to successively lift the lifting member into different adjusted positions, and means adapted to bear on the engine block beneath said lifting member for supporting said camming means.

2. In valve spring lifter, the combination of an angle bar having recesses for simultaneously embracing a plurality of valve stems, supports pivoted beneath said bar and having means for maintaining the bar in different adjusted positions, means for elevating said bar and means for guiding said bar during the elevation thereof.

3. In a valve spring lifter, the combination of a lifting member constructed to lift a plurality of valve springs simultaneously, a wrench-receiving swinging cam means for elevating said lifting member and located directly under said lifting member and constructed to successively lift the lifting member into different adjusted positions on the swinging of said cam means.

4. In a valve spring lifter, the combination of a lifting member for lifting simultaneously a plurality of valve springs, swinging cam means located directly under said lifter and having the face thereof formed to elevate the springs to various adjusted positions and means for swinging said cam means.

5. In a valve spring lifter, the combination of a lifting member constructed to lift a plurality of valve springs simultaneously, a wrench-receiving swinging cam means movable transversely of the length of said lifting member for elevating said lifting member and located directly under said lifting member and constructed to successively lift the lifting member into different adjusted positions on the swinging of said cam means.

6. In a valve spring lifting mechanism, the combination of a lifting member, means for operating the same and swinging means adapted to engage the engine block and constructed to maintain said lifting member in different adjusted positions.

7. In a valve spring lifting means, the combination of a lifting member, shiftable cam means for elevating said member and constructed to maintain said lifting member in different adjusted positions.

8. In a valve spring lifting mechanism the combination of a lifting bar and camming means having a stepped formation for maintaining the bar in various adjusted positions.

9. In a valve spring lifting means, the combination of a lifting member for simultaneously lifting a plurality of valve springs, a cam located directly under said lifting member and between the valve springs and the bottom wall of the valve spring chamber for lifting said member and having a plurality of successively differently formed faces for lifting said member into different adjusted positions and means for operating said cam.

10. In a valve spring mechanism for an engine having a housing stud or bolt the combination of a bar having means for seating a plurality of valve spring retainers, said bar also having a slot for receiving said stud or bolt, and guide means at opposite sides of said means and engageable with the engine for guiding said bar.

11. In a valve spring lifting mechanism the combination of a bar formed of a pair of angularly located sides, one of said sides having a plurality of seats for valve spring retainers, and guide means projecting transversely of said bar beyond said seats and adapted to engage a part of the engine for guiding said bar.

12. In a valve spring lifting mechanism the combination of a lifting member comprising an upright portion having means extending therefrom for forming one or more valve spring retainer seats, and a guide member extending transversely of said lifting member beyond said seats and engageable with the engine for guiding the lifting member.

13. In a valve spring lifting mechanism for an engine having a housing stud or bolt, the combination of a lifting bar having a vertical slot for receiving said stud or bolt, and guide means at each side of said slot and adapted to engage the engine for guiding said bar in a vertical plane.

14. In a valve spring lifter, the combination of a lifting member constructed to simultaneously lift a plurality of valve springs, cam means having a wrench-receiving portion and located below said lifting member and between the valve springs and the bottom wall of the valve spring chamber and formed to successively lift the lifting member into different adjusted positions, said cam means and lifting member being detachably interconnected.

15. A valve spring lifting mechanism comprising an angle bar having recesses for embracing a plurality of valve stems, supports pivoted beneath said bar for maintaining the same in elevated position, means for swinging said supports, means for limiting the swinging movement thereof, and means for guiding said bar during the elevation thereof.

16. In a valve spring lifting mechanism the combination of lifting means comprising a horizontal member and a vertical member connected together, and shiftable means operative beneath said horizontal member and having means for maintaining said lifting means in different elevated positions.

17. Valve spring lifting mechanism comprising lifting means adapted to operate against a plurality of valve springs, and means for supporting said means, one of said means having a plurality of cam surfaces.

18. In a valve spring lifter, the combination of a lifting member constructed to simultaneously lift a plurality of valve springs and comprising an angle bar, a plurality of swinging cams pivotally supported by said angle bar transversely to the length thereof and each having a wrench-receiving portion at the outer side of said bar and in position directly under said bar to engage the engine block and shiftable in the arc of a circle in the direction of the length of said bar to raise the lifting bar.

19. In a valve spring lifter, the combination of a lifting member constructed to simultaneously engage a plurality of valve springs, cam means pivotally located transversely to the lifting bar and shiftable in the arc of a circle directly below said bar and between the valve springs and the bottom of the valve spring chamber and having a wrench-receiving portion at the outer side of said bar thereby to shift the cam means and raise the bar, said cam means constructed to adjust and hold the lifting bar in different adjusted positions.

20. Valve spring lifting mechanism comprising means adapted to extend beneath a plurality of valve springs for operating thereagainst, and pivoted means movable longitudinally of said means and into position beneath the springs and the base of the valve spring chamber for elevating said means.

21. In a valve spring lifting mechanism the combination of a lifting member having means for operating against a plurality of valve springs, and a shiftable support for said member and having the peripheral edge thereof provided with means for maintaining the same in various adjusted positions.

22. In a valve spring lifting mechanism, the combination of a lifting member having means adapted to extend beneath a valve spring for operating thereagainst, means for operating said member, and means formed independently of said last means and extending from said member for engagement with the engine in rear of the valve springs for guiding the lifting member.

23. In a valve spring lifting mechanism, the combination of a lifting member having means for operating against a plurality of valve springs, a plurality of cams for elevating said lifting member, each having a wrench-engaging portion and means for guiding said member against displacement relatively to the valve springs.

Signed at New York city, New York, this 10th day of February, 1923.

LOUIS M. WOOD.